(12) United States Patent
Grävingholt et al.

(10) Patent No.: US 11,247,844 B2
(45) Date of Patent: Feb. 15, 2022

(54) CONVEYING DEVICE

(71) Applicant: KHS GmbH, Dortmund (DE)

(72) Inventors: Stefan Grävingholt, Witten (DE); Thomas Greiving, Lüdinghausen (DE); Berthold Paroth, Dortmund (DE); Zlatko Sarajlija, Dortmund (DE); Thomas Stienen, Unna (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/764,104

(22) PCT Filed: Nov. 26, 2018

(86) PCT No.: PCT/EP2018/082527
§ 371 (c)(1),
(2) Date: May 14, 2020

(87) PCT Pub. No.: WO2019/110349
PCT Pub. Date: Jun. 13, 2019

(65) Prior Publication Data
US 2020/0277142 A1 Sep. 3, 2020

(30) Foreign Application Priority Data
Dec. 8, 2017 (DE) ...................... 10 2017 129 293.4

(51) Int. Cl.
*B65G 21/06* (2006.01)
*B65G 15/62* (2006.01)
*B65G 21/22* (2006.01)
*F16B 2/12* (2006.01)

(52) U.S. Cl.
CPC ............. *B65G 21/06* (2013.01); *B65G 15/62* (2013.01); *B65G 21/22* (2013.01); *B65G 2201/04* (2013.01); *B65G 2207/16* (2013.01); *F16B 2/12* (2013.01)

(58) Field of Classification Search
None
See application file for complete search history.

(56) References Cited

U.S. PATENT DOCUMENTS

| | | | |
|---|---|---|---|
| 6,269,939 B1 | 8/2001 | Lapeyre et al. | |
| 6,523,679 B1 * | 2/2003 | Manchester | B65G 15/62 198/841 |
| 7,222,728 B2 * | 5/2007 | Wier | B65G 15/02 198/816 |
| 7,246,697 B2 * | 7/2007 | Hosch | B65G 21/06 198/831 |
| 7,562,766 B2 * | 7/2009 | Call | B65G 15/62 198/840 |
| 9,522,785 B1 | 12/2016 | Rottier et al. | |
| 9,611,098 B1 * | 4/2017 | DeGraw | B65G 15/44 |
| 10,399,786 B2 * | 9/2019 | Askerdal | B65G 21/06 |

FOREIGN PATENT DOCUMENTS

| | | |
|---|---|---|
| AU | 503456 B1 | 9/1979 |
| EP | 1787925 A2 | 5/2007 |
| FR | 1066962 A | 6/1954 |

(Continued)

*Primary Examiner* — Kavel Singh
(74) *Attorney, Agent, or Firm* — Occhiuti & Rohlicek LLP

(57) ABSTRACT

A quick fastener in a conveying device that conveys goods detachably secures a profile element to a base support of the conveying device's machine frame.

20 Claims, 8 Drawing Sheets

(56) References Cited

FOREIGN PATENT DOCUMENTS

| | | | |
|---|---|---|---|
| FR | 2915474 | A1 | 10/2008 |
| GB | 2176454 | A | 12/1986 |
| WO | 9117938 | A1 | 11/1991 |
| WO | 0132534 | A1 | 5/2001 |
| WO | 2017087321 | A1 | 5/2017 |
| WO | 2018157992 | A1 | 9/2018 |

\* cited by examiner

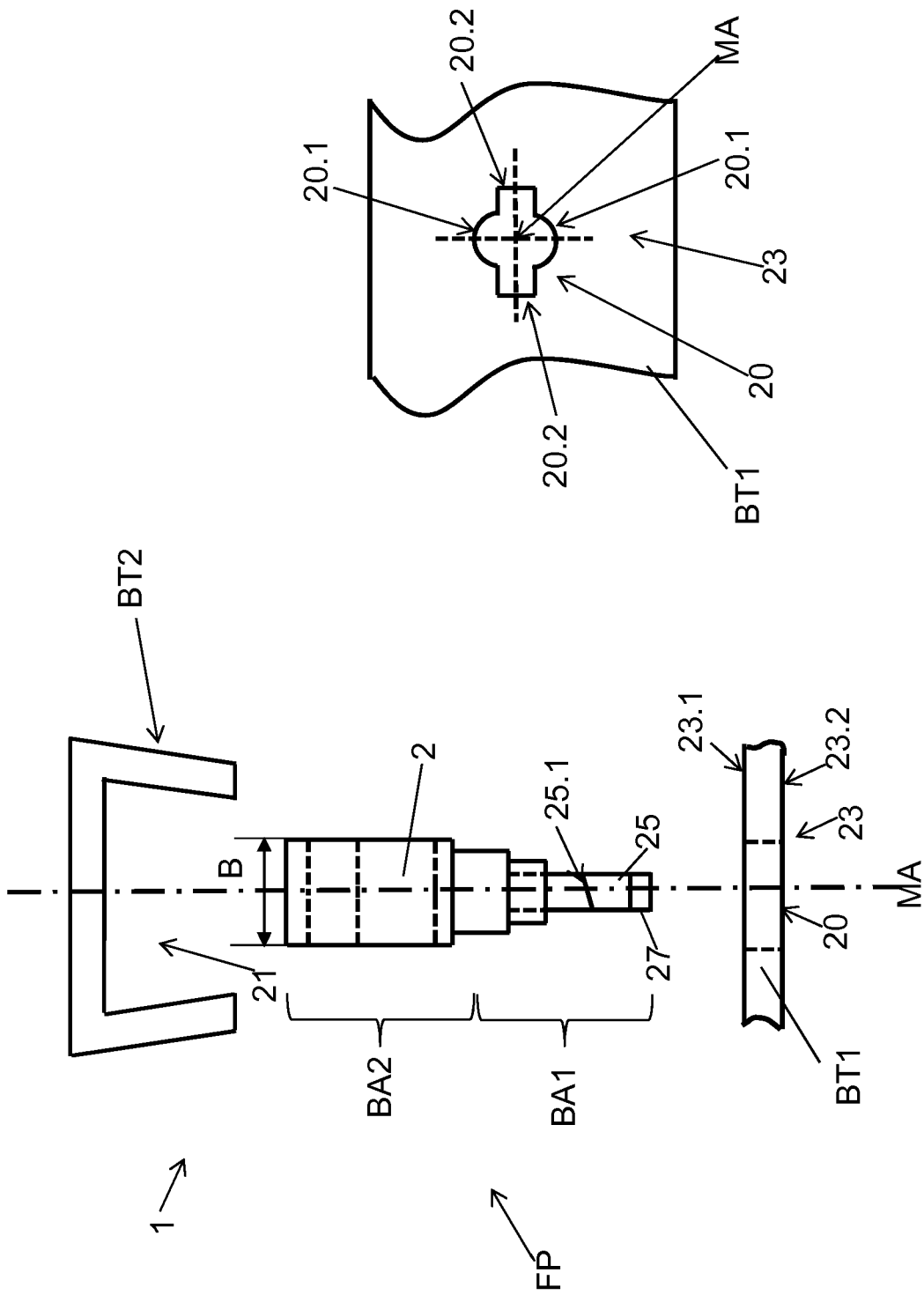

CONVEYING DEVICE

RELATED APPLICATIONS

This is the national-stage of international application PCT/EP2018/082527, filed Nov. 26, 2018, which claims the benefit of the Dec. 8, 2017 priority date of German application DE102017129293.4, the contents of which are herein incorporated by reference.

FIELD OF INVENTION

The invention relates to a conveying device for conveying goods in a direction of conveyance.

BACKGROUND

In the beverage industry, conveying machines convey piece goods, such as containers, between different container-processing machines. A typical conveying machine features one or more conveyors upon which the goods stand. Examples of such conveyors are those made of chains, such as hinged band chains. The conveyors form a closed loop. Usually, the top surface of the conveyor, which is what supports the goods, rests on a sliding guide.

Such conveying devices have a great deal of carrying capacity. For example, it is not unusual for such a device to have a throughput of as many as 10,000 or even 50,000 containers per hour.

SUMMARY

A conveying device as described herein features a detachable fastening device that is configured as a quick fastener, or quick-fastening device, that couples or secures or connects a profiled element to a base support. Such a fastener permits detachable connection without the need for a screw or a similar fastening element. The fastener provides a stable connection in which the two attached components maintain the same relative positions.

In one aspect, the invention features a conveying device that includes a machine frame having a base support, a conveyor, a front deflector, a rear deflectors, a sliding strip, a profiled element, and a fastener. The conveying device conveys goods along a conveyance direction. The conveyor is a driven conveyor that forms a loop around the front and rear deflection devices and that forms a conveying line between the front and rear deflection devices as it slides along the sliding strip. The sliding strip is arranged in sections along the line and disposed on the profiled element. The fastener is a quick-fastener that detachably secures the profiled element to the base support.

In some embodiments, the fastener adjusts between locking and releasing positions. In the locking position, the fastener secures the profiled element to the base in a detachable manner. In the release position, the fastener permits detachment of the two.

In some embodiments, the fastener is configured to transition between a locking position and a releasing position. In the locking position, the fastener detachably secures the profiled element to the base support.

In some embodiments, the fastener extends along a middle longitudinal axis, hereafter referred to as simply the "axis." The fastener includes a securing section that extends along that axis. It is this securing section that connects the profiled element and the base support at opposing ends thereof.

Also among the embodiments are those in which the fastener includes securing sections that are configured form a non-positive fit connection and/or a positive fit connection when the fastener is in a locking position thereof.

In some embodiments, when the fastener is in the locking position, a securing position of the fastener is inserted into a cut-out opening of the profiled element and another securing position of the fastener is inserted through a perforation in the base support.

In still other embodiments, the fastener includes a securing section that is snapped into a structure when the fastener is in the locking position. Examples of such a structure include the profiled element and the base support.

In still other embodiments, the fastener includes securing sections such that, when the fastener is in a locking position, one of the securing sections engages a cut-out opening in the profiled element and another of the securing sections extends through a perforation in the base support to clamp a locking element on a rear surface of the base support.

In still other embodiments, the fastener is configured to transition between a locking position and a releasing position as a result of rotation of the fastener about an axis thereof. In those cases in which the fastener comprises separately rotatable sections, rotating the fastener should be construed to include rotating any part of the fastener.

In still other embodiments, the fastener is a rotary locking device that transitions between locking and releasing positions as a result of rotation thereof and wherein, when in the locking position, the rotary locking device produces at least one connection selected from the group consisting of a non-positive fit connection and a positive fit connection.

In still other embodiments, the fastener includes first and second securing sections, wherein the securing sections comprise free ends that have corresponding first and second locking sections disposed thereon, wherein the base support includes a flat section having a non-circular perforation extending therethrough, wherein the perforation has a cross section that matches that of the first locking section such that the first locking section is passable through the perforation, wherein the profiled element includes a profiling section that forms a cut-out opening having a cross section that matches that of the second locking section such that the locking section is receivable in the cut-out opening, and wherein rotation of the fastener causes the second locking section to clamp the second securing section to the profiled element and causes a positive fit between the second locking section and the profiled element.

In still other embodiments, the fastener includes first and second securing sections, wherein the securing sections comprise free ends that have corresponding first and second locking sections disposed thereon, wherein the base support includes a flat section having a non-circular perforation extending therethrough, wherein the perforation has a cross section that matches that of the first locking section such that the first locking section is passable through the perforation, wherein the profiled element includes a profiling section that forms a cut-out opening having a cross section that matches that of the second locking section such that the locking section is receivable in the cut-out opening, and wherein rotation of the fastener causes the second locking section to clamp the second securing section to the profiled element and causes a positive fit between the second locking section and the profiled element.

In still other embodiments, the fastener includes a first securing section that includes a locking section at a free end thereof and wherein the locking section includes a locking element that extends radially outward from the locking section. Among these embodiments are those in which the first securing section includes a free end having a first locking section disposed thereon, the first locking section includes a contact section that defines a receiving groove, and the receiving groove extends radially outward from an axis of the fastener. Also among these embodiments are those in which the receiving groove extends along at least a portion of a circle that is concentric with the axis and the contact section contacts the base support at a contact surface along the circle.

In some embodiments, when the fastener is in the locking position, a locking element of the fastener has been guided through a perforation in the base support and the fastener has been rotated relative to the base support such that the locking element engages an underside of the base support. Among these are embodiments in which the fastener includes a first securing section that includes a free end having a first locking section disposed thereon, the first locking section includes a contact section that defines a receiving groove, and the receiving groove extends radially outward from an axis of the fastener. The locking element, as a result of the fastener having been rotated, clamps to the underside, the underside being that of a flat section of the base support. A securing section of the fastener is pressed against the contact section at a contact surface on a top side of the flat section of the base support such that the flat section is clamped between the contact surface and the locking element.

In some embodiments, the fastener includes a clamping body that has a cross-section. An end section of the clamping body faces the profiled element. This cross section has a length. The clamping body is tapered such that the length is greatest where the clamping body is closest to the profiled element and least where the clamping body is furthest from the profiled element. Among these embodiments are those in which the end section of the clamping body includes straight contact sections on opposing sides of the clamping body, those in which the profiled element is C-shaped, those in which, when the fastener is in a locking position, the clamping body spreads corresponding inner sides of the profiled element so as to form a clamp seat in a cut-out opening formed between side limb sections of the profiled element, and those in which the cross section has a width that is selected such that, when the fastener is in a release position, the clamping body can be guided through a cut-out opening formed by the profiled element.

In still other embodiments, the fastener is one of a plurality of identical fasteners, among which is a fastener that detachably secures a component to the base support. Examples of such a component include an electrical part, a switch, a sensor, a mechanical component, a mirror, a holder for a railing that guides containers, a holding plate, a holding strip, and a switch box for accommodating an electrical circuit.

The expressions "essentially" or "approximately" signify in the meaning of the invention deviations in each case from the exact value by +/−10%, preferably by +/−5% and/or deviations in the form of changes which are not of significance for the function.

Further embodiments, advantages, and possible applications of the invention also derive from the following description of exemplary embodiments and from the Figures. In this context all the features described and/or represented are in principal the object of the invention and/or in any combination, regardless of their combination in the claims or reference to them. The content of the claims is also made a constituent part of the description.

BRIEF DESCRIPTION OF THE FIGURES

The invention is explained in greater detail hereinafter on the basis of Figures relating to exemplary embodiments. These show:

FIG. 5*a* is an exploded view of a fastener in its releasing position;

FIG. 5*b* is a view of the base support from above showing the perforation for engaging the fastener;

In the figures, identical reference numbers are used for elements of the invention which are the same or have the same effect. Moreover, for the sake of easier overview, only reference numbers are used in the individual figures which are required for the description of the respective figure.

DETAILED DESCRIPTION

Figure 1:
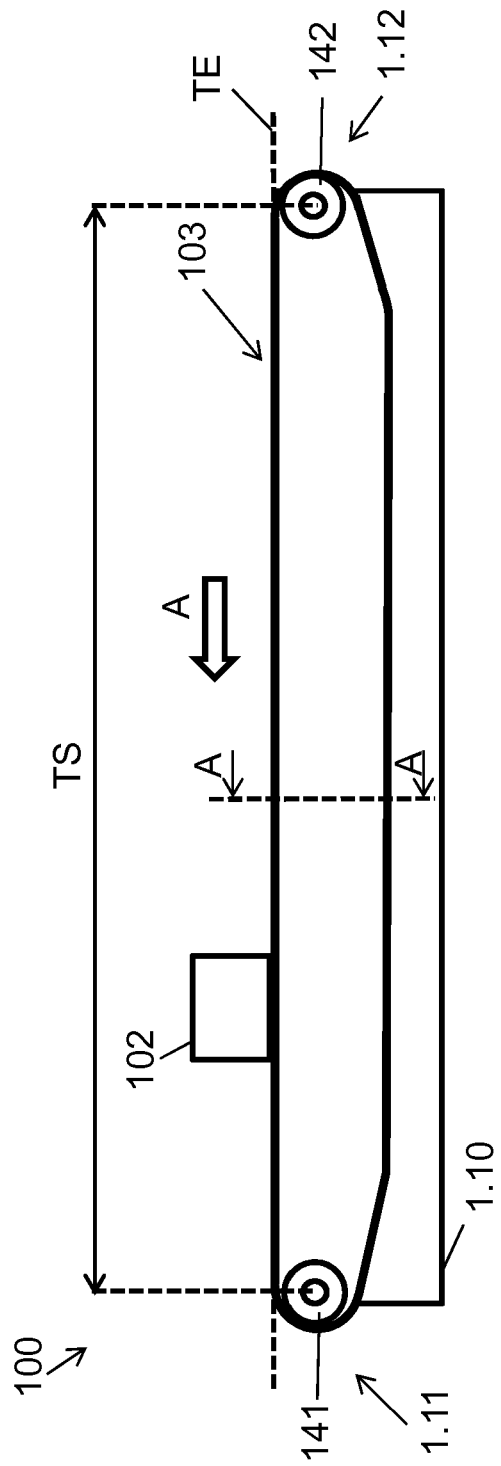
FIG. 1 is a side view of a conveying device.

FIG. 1 shows a conveyor 100 that conveys containers 102 along a transport direction "A" between various machines. The machines can be container treatment machines, handover stations, transfer stations, transition stations, or combinations thereof. A typical conveying device moves more than 10,000, and in some cases, more than 50,000 containers 102 per hour.

The transport direction "A" defines first and second perpendicular lines. The first perpendicular line passes through a conveying element 103 along a "vertical" direction. The second perpendicular line extends along a "transverse" direction.

The conveying device 100 includes a conveying element 103 that forms a closed loop. The conveying element 103 circulates endlessly along the transport direction "A." Examples of a conveying device 100 include a conveying belt, a conveying chain, a hinged band chain, and a conveying mat.

The conveying element's upper length forms a conveying plane TE on which containers 102 stand on their bases. The conveying element 103 goes around a front deflection device 141 at a front end 1.11 and a rear deflection device 142 at a rear end 1.12. Between the front and rear ends 1.11, 1.12 is a conveying line TS. Each deflection device 141, 142 includes a motor that drives the deflection device 141, 142. A suitable motor is an electric motor. Suitable electric motors include a gearless electric motor, a directly driven electric motor, a stepping motor, a servomotor, and a torque motor.

Figure 2:
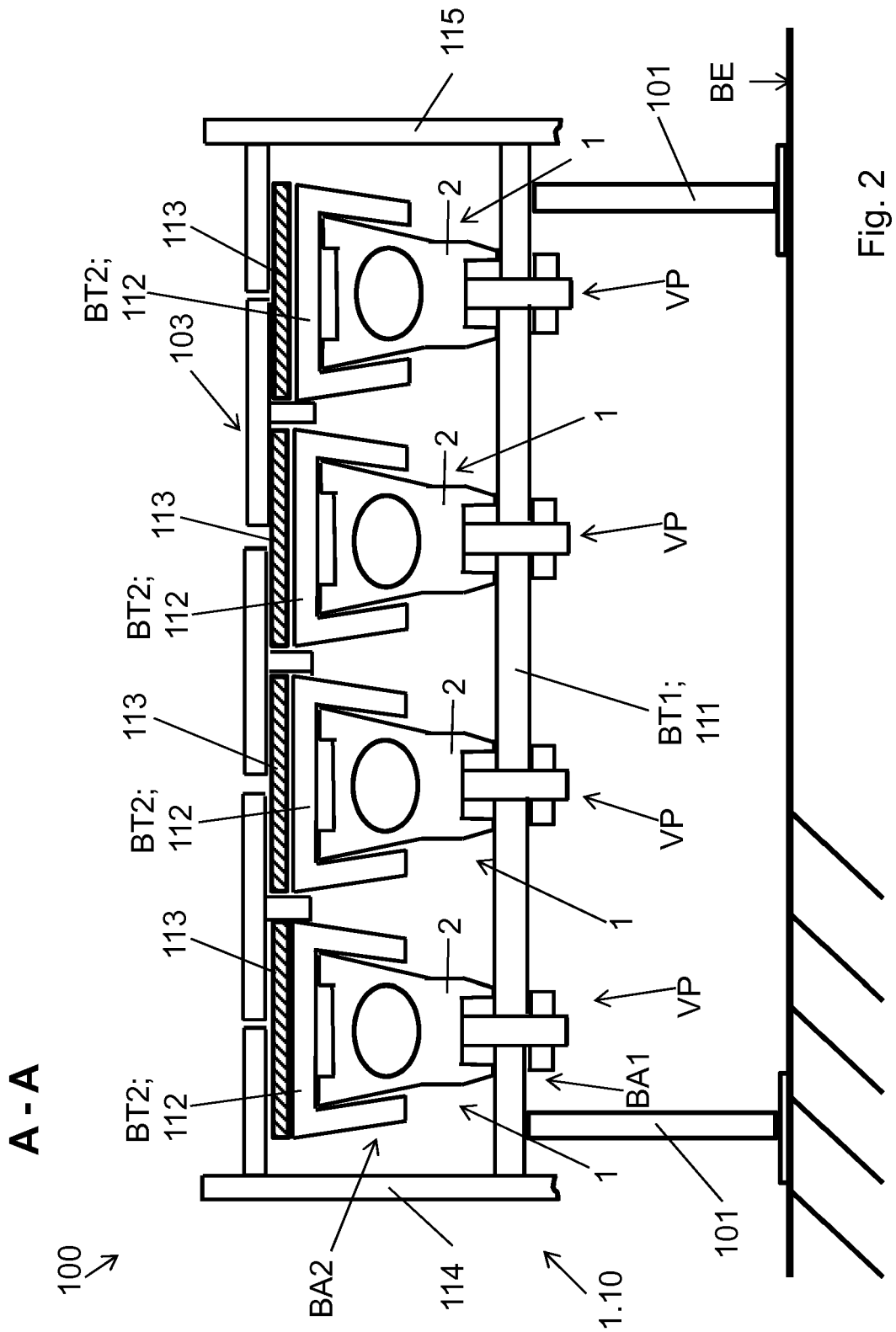
FIG. 2 is a sectional view along the line A in FIG. 1 showing fasteners securing profiled elements to a base section.

Referring now to FIG. 2, sliding strips 113 support multiple conveying element 103 to form a horizontal conveying surface TE, which is shown in FIG. 1. The conveying elements 103 are arranged next to each other along the transverse direction. As a result, they form adjacent rows.

The conveying device 100 also includes a frame 110, shown in FIG. 1, on which its components can be arranged or accommodated. The frame 110 supports the conveying device 100.

Referring now to FIG. 2, the machine frame 110 comprise base supports 111. Each base support 111 extends over the conveying element's entire width in the transverse direction. Legs 101 support each base support 111 on the floor BE. The base supports 111 are disposed along the conveying line TS, typically at uniform spacing intervals, with each such base element 111 supported by legs 101. Typically, there will be one base support 111 near the front end 1.11 and another base support 111 near the rear end 1.12 of the conveying device 100.

FIG. 2 shows four quick fasteners 2 that are detachably connected with their respective first securing sections BA1 to a common base support 111 and with their second securing sections BA2 with a corresponding profiling element 112. A sliding strip 113 on the upper side of the respective profiled element 112 is secured to the respective element 112 either by being screwed, soldered, adhesively bonded, or welded. The conveyor 103 lies over the sliding strips 113 so as to slide over the upper sides of the sliding strips 113. Right and left frame plates 114, 115 stand on either side of the of the base support 111. Preferably, the profiled elements 112 and/or the sliding strips 113 and/or the frame plates 114, 115 extend over the entire length of the conveying line TS and are either formed as one piece or as multiple pieces joined together.

Referring now to FIG. 5b, each base support 111 includes a flat section 23 and a non-circular perforation 20 through the flat section 23 that can be formed by a limb of the base support 111. The illustrated perforation 20 has mirror symmetry and includes identical arcuate sections 20.1 and rectangular sections 20.2.

As shown in FIG. 2, the base support 111 extends transverse to the transport direction "A" and includes several perforations 20, each of which is under a corresponding sliding strip 113.

The conveying element 103 is guided so that it slides along the conveying line TS on a sliding strip 113. The sliding strip 113 extends along a plane that is parallel to and beneath the conveying plane TE.

Some embodiments feature several sliding strips 113. It is particularly useful to have sliding strips 113 along the entire conveying line TS along which the conveying element 103 moves. In such cases, there are several sliding strips 113 beneath the conveying element 103. In the particular example shown in FIG. 2, there are four sliding strips 113 arranged side-by-side along the transverse direction with their longitudinal extensions along the transport direction "A." In a preferred embodiment, the sliding strips 113 are arranged to be flush with each other, thus forming a straight row of sliding strips 113. The upper sides of the sliding strips are preferably made of a material with a low friction coefficient, such as a plastic.

At least a section of a sliding strip 113 is arranged at a profiled element 112 that is coupled to a base support 111 by a quick-release device 2.

Figure 3:
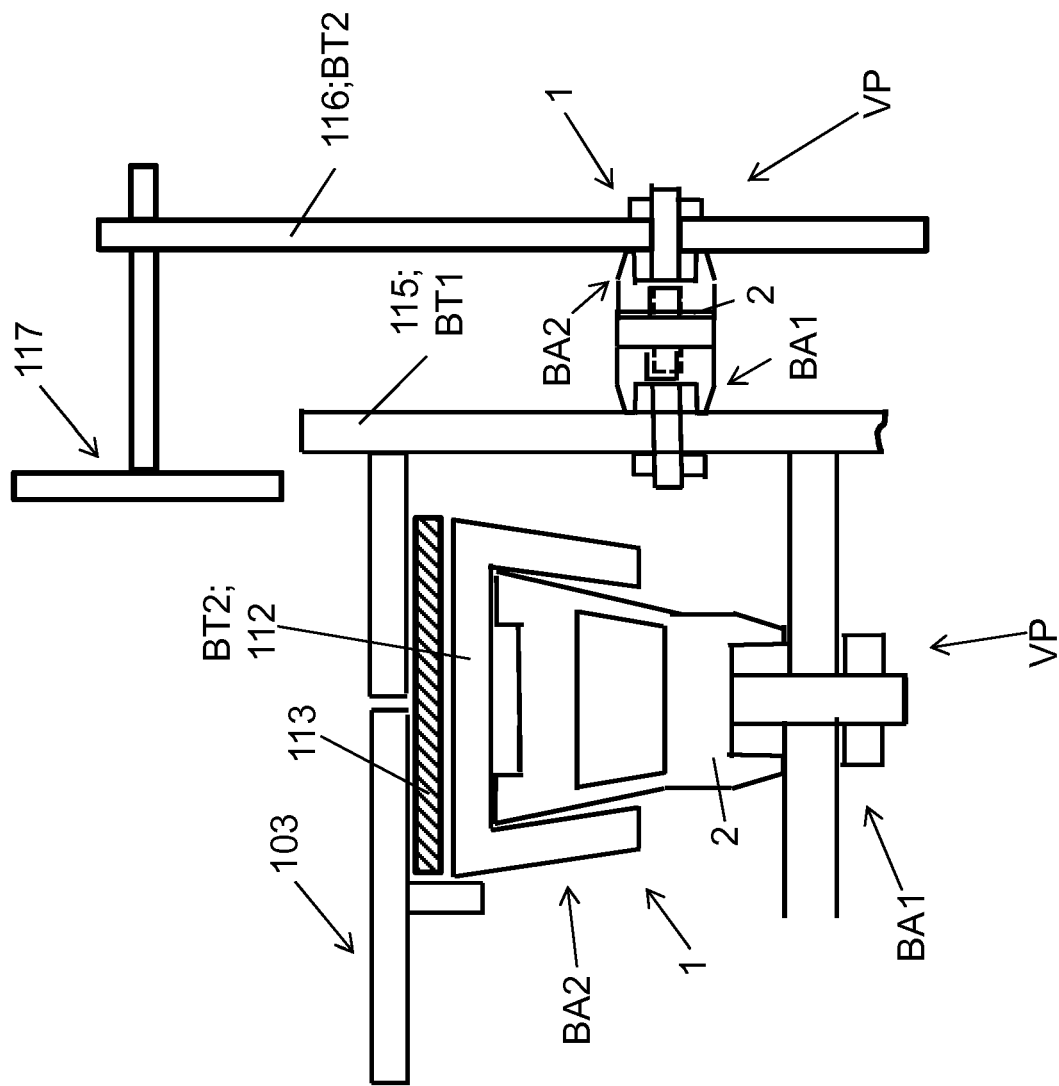
FIG. 3 is a view of a fastener being used to attach a component.

Referring to FIG. 3, the profiled element 112 has a middle limb 22.1 and two side limbs 22.2. The sliding strip 113 is secured to the middle limb 22.1, either by being screwed, clamped, or adhesively bonded thereto.

The profiled element 112 extends along a plane that is parallel to and beneath the plane spanned by the sliding strips 113. This plane lies beneath the conveying plane TE.

Each side limb 22.2 extends downward from the middle limb 22.1 to form an acute angle between the side limb 22.2 and the middle limb 22.1. The side limbs 22.2 extend downward to their free ends 22.3.

As shown in FIG. 3, the middle limb 22.1 and the side limb 22.2 define a downwardly-opening groove 21 that faces the base support 111 and that can be accessed from the base support 111. The groove's cross-section is that of an inverted cone.

The middle limb's width along the transverse direction corresponds to that of a sliding strip 113, as shown in FIG. 2. The sliding strip 113, which is rectangular when seen from above, has a length that extends in the transport direction "A". This length corresponds to that of the profiled element 112. Thus, the middle limb 22.1 is also essentially rectangular when seen from above.

A quick fastener 2 on the base support 111 of the machine frame 110 connects the profiled element 112 to the base support 111. In FIG. 3, the quick fastener 2 is in a locking position in which it securely but detachably connects the profiled element 112 to the base support 111.

The quick fastener 2 adjusts between a locking position VP and a releasing position FP. When in the locking position, the quick fastener 2 connects the profiled element 112, securely but detachably, to the base support 111. When in the releasing position, the fastener permits the profiled element 112 to be detached.

Referring to FIG. 3, the quick fastener 2 includes first and second securing sections BA1, BA2 that extend along a medial axis MA, which lies in a medial plane ME.

The first securing section BA1 connects to the base support 111. In some embodiments, it does so with a non-positive fit connection. In others, it does so with a positive fit connection.

The second securing section BA2 connects to the profiled element 112. In some embodiments, it does with a non-positive fit connection. In others, it does so with a positive fit connection.

In some embodiments, when in the locking position, the first securing section BA1 is inserted to be latched into the base support 111 and the second securing section BA2 is inserted into the profiled element 112 or into the base support 111 respectively. In particular embodiments, when in the locking position VP, the first securing section BA1 can be inserted into the perforation 20 of the base support 111.

In other embodiments, when in the locking position VP, the first and/or second securing sections BA1, BA2 snap into the profiled element 112 and/or into the base support 111 by having the first and/or second securing sections BA1, BA2 include a locking element 25. behind the perforation 20 of the base support 111 and/or the cut-out opening 21 of the profiled element 112. In the locking position VP, the locking element has been snapped into the perforation 20 of the base support 111 and/or the cut-out opening 21 of the profiled element 112.

In some embodiments, when the quick fastener 2 is in the locking position, the first and/or second securing sections BA1, BA2 connect securely to the profiled element 112 and/or the base support 111. In such embodiments, the first and/or second securing sections BA1, BA2 engage with a locking element 25 behind the perforation 20 of the base support 111 and/or the cut-out opening 21 of the profiled element 112.

The quick fastener 2 rotates about the medial axis MA thereof between a locking position VP and a releasing position FP. It does so in such a way that when the quick fastener 2 is in its locking position VP, it secure the profiled element 112 to the base support 111. Then, when it is rotated into its release position FP, the profiled element 112 can be detached from the base support 111. In such embodiments, the quick fastener 2 is a rotary locking device that, in its locking position VP, creates either a non-positive fit or a positive fit.

The quick fastener 2 can also be used to detachably secure other components, either directly or indirectly, to the machine frame 110. Examples of such other components include electrical components such as repair switches and/or sensors, mechanical parts, mirrors for light barriers, holders for railings for the guiding of containers, holding plates, and/or holding strips and/or switchboxes for accommodating electrical circuits.

FIG. 3 shows a holding element 116 having an attached guide rail 117 that hangs over the frame plate 115. A fastener 2 connects the retaining plate 116 to the frame plate 115. As shown in the figure, the fastener's first fastening portion BA1 fastens to a first component BT1, which in this case is a portion of the right plate 115. The fastener's second securing section BA2 fastens to a second component BT2, which in this case is the holding element 116. Both attachments are detachable.

Figure 4:
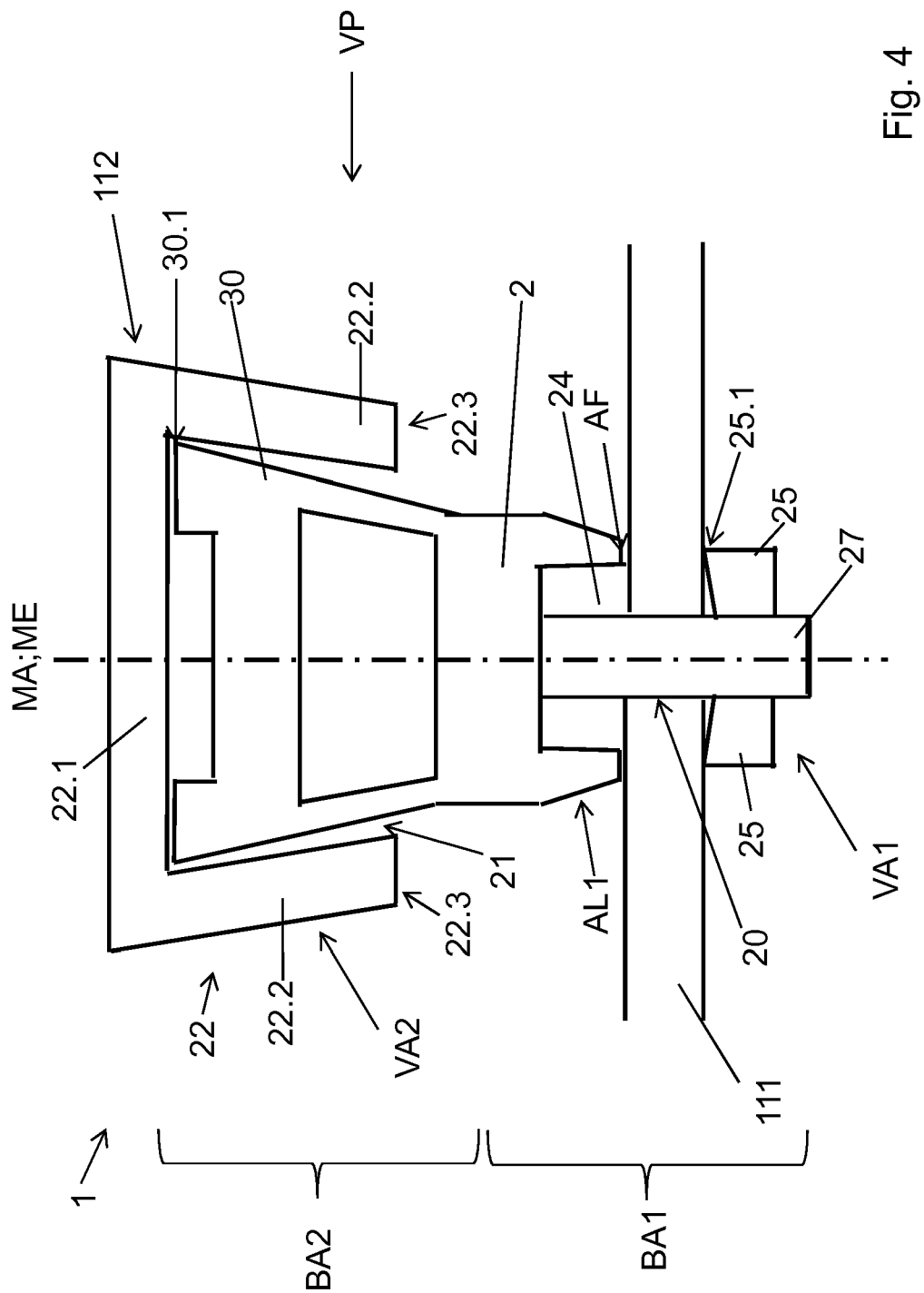
FIG. 4 is a view of a fastener from the conveyor shown in FIG. 2 in its locking position.

FIG. 4 shows a side-view of an assembly 1 in a locking position VP. In this locking position, the quick fastener 2 detachably secures a profiled element 112 to the base support 111.

As shown in FIG. 4, the first securing section BA1 is detachably secured to the base support 111 and the second securing section BA2 is detachably secured to the profiled element 112. As a result, the base support 111 and the profiled element 112 are detachably secured to one another.

FIG. 4 shows first and second locking sections VA1, VA2. The first locking section VA1 is on a free end of the first securing section BA1. The second locking section VA2 is on the second securing section BA2.

The first locking section VA1 secures the fastener to the base support 111 when the fastener 2 is in its locking position VP. The second locking section VA1 engages the profile device 112.

To secure the fastener 2 to the base support 111, the base support 111 features a flat section 23, best seen in FIGS. 5a and 5b, that has a non-circular perforation 20 extending through it. The perforation's cross section is such that a longitudinal extension of the first locking section VA1 can be introduced through the perforation 20. Once this is done, the fastening device 2 is rotated about the medial axis MA to clamp the first securing section BA1 at the base support 111.

The first securing section BA1 includes a first contact section AL1 that forms a receiving groove 24 around the medial axis MA. The first contact section AL1 is adjacent to the second securing section BA2, in particular arranged on it.

A contact surface AF that defines the receiving groove 24 goes at least part way if not all the way around the medial axis MA. The receiving groove 24 is sized so that it cannot go through the perforation 20 but instead sits on the flat section 23.

The securing section BA1, also has a locking element 25 that extends from a tubular section 27 that is coaxial with the medial axis MA. and the locking element 25 extends radially outward and functions as a locking finger. In some embodiments, there are two or more such locking elements 25. These are preferably at opposing sides of the tubular section 27. The tubular section 27 has a thickness that accommodates the base support 111.

The locking element 25 has, on its upper side, which faces the second securing section BA2, an oblique contact surface 25.1. This contact surface 25.1 makes an acute angle towards the medial axis MA, as can be seen in particular from FIG. 4.

To transition into the locking position VP, the locking element 24 is guided through the perforation 20 and rotated relative to the base support 111. The angle of rotation is specific to the geometry. In the illustrated embodiment, a 40° is appropriate. This rotation causes the locking element 25, which has been passed through the perforation 20, to engage the flat section 23 on its side facing away from the second securing section BA2 and to come into contact with the surface around the perforation 20.

When the first locking section VA1 is rotated, the oblique contact surface 25.1 contacts and clamps against the flat section 23 of the base support 111. It does so on a side that faces away from the second securing section BA2 and also in such a way that the flat section 23 is pressed against the contact surface AF of the receiving groove 24. The flat section 23 is thus clamped between the contact surface AF and the oblique contact surface 25.1.

FIG. 5b shows the flat section 23 from above. From this viewpoint, it is possible to see the shape of the perforation 20. As is apparent, the perforation 20 is a mirror-symmetrical opening having two identical arc-shaped sections 20.1 and two identical rectangular sections 20.2. These are shaped to fit to the first locking section VA1 such that the first locking section VA1, and in particular, a locking element 25 thereof, can be introduced through the rectangular sections 20.2 and blocked against subsequent withdrawal by a rotation, which in this case is a rotation of about forty degrees. Such a perforation 20 is produced by laser cutting, drilling, or punching through the flat surface section 23.

The flat section 23 comprises a planar upper side 23.1 that faces the second securing section BA2. It also has a planar underside 23.2 that faces away from the second securing section BA2. The upper side 23.1 and the lower side 23.2 are in parallel planes. Thus, the flat surface section 23 has constant thickness.

Referring to FIG. 4, the profiled element comprises a profiling section 22 that forms a cut-out opening 21. The cut-out opening's cross-section is shaped in a manner that depends on the second locking section's cross-section. In particular, the cross section is such that the cut-out opening 21 can receive the second locking section VA2 to form a positive fit or a non-positive fit upon rotation of the second locking section VA2 about the medial axis MA.

The second locking section VA2 includes a clamping body 30. As shown in FIG. 6a, the clamping body 30 has an oval cross section with a maximum length L at a free end 30.1 thereof, which faces the second component BT2. The length decreases with distance form the top end such that the clamping body 30 is tapered.

The oval clamping body 30 has two straight contact surfaces 30.2, 30.3 on either side of the free end 30.1. When the fastener 2 is in a locking position, these clamp against the corresponding inner sides of the two side limbs 22.2 and thus form a clamping seat. The two side limbs 22.2 are elastically deformable and thus yield to the clamping body 30 as it rotates into the locking position. A typical extent of rotation is about forty degrees.

FIG. 4 shows the locking position VP while FIG. 5a shows the releasing position FP.

In another embodiment, the fastener 2 is formed in one piece so that the first and second securing sections BA1, BA2 are rotated together instead of separately. In such embodiments, the clamping body's cross section has a width B, shown in FIG. 5a, such that when the fastener 2 is in its releasing position FP, it is possible to introduce the clamping body 30 into the cut-out opening 21.

In addition, the clamping body's length L is such that, when the fastener 2 is in its locking position VP, the contact surfaces 30.2, 30.3 spread the side limbs 22.2 of the second component BT2, thus forming a clamping seat. As a result of rotation from the releasing position FP into the locking position VP, the clamping body 30 presses against the underside of the middle limb 22.1 and contacts at the underside of the middle limb 22.1 on reaching the locking position VP. This results in the fastener having a defined relative to the profiled element 112.

Figure 6B:
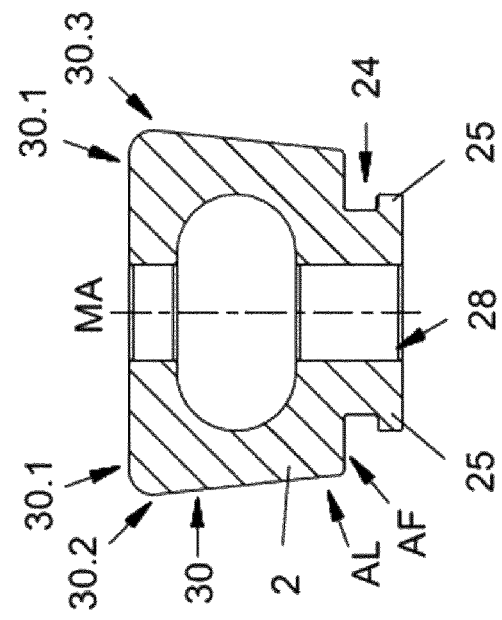
FIG. 6*b* is a sectional view of the fastener shown in FIG. 6*a*.
Figure 6A:
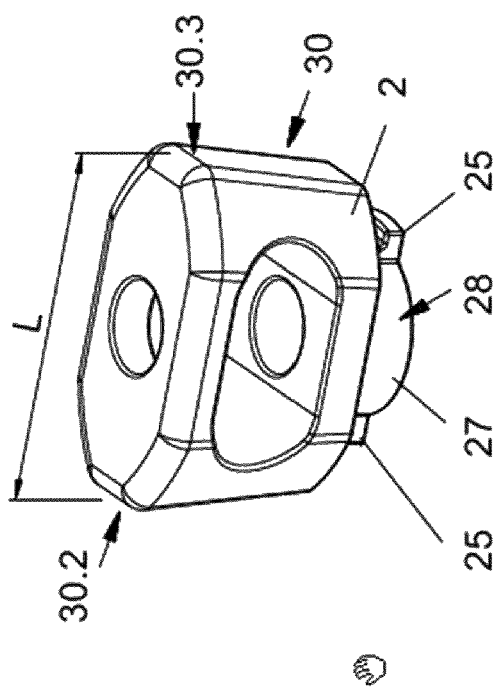
FIG. 6*a* is a perspective view of a fastener.

Referring now to FIGS. 6a and 6b, the quick-fastening device 2 comprises an opening 28 that defines a passage that passes through the first and second securing sections BA1, BA2. Within the tubular section 27, this passage has internal walls that are shaped to accommodate a tool so that the tool can be used to cause a transition between locking and releasing positions. In one example, the internal walls define a hexagon for use with a hexagonal-headed wrench.

Figure 7B:
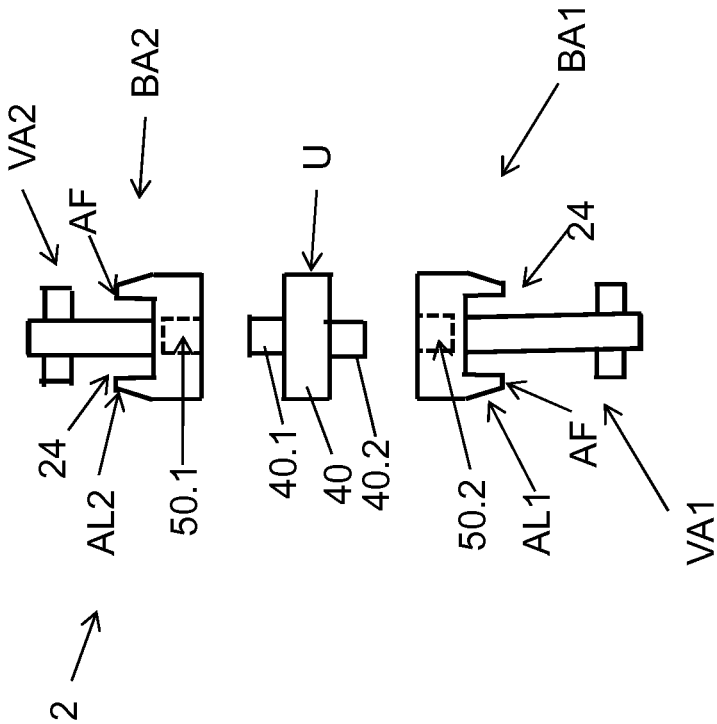
FIGS. 7*a* and 7*b* show exploded views of additional fasteners.
Figure 7A:
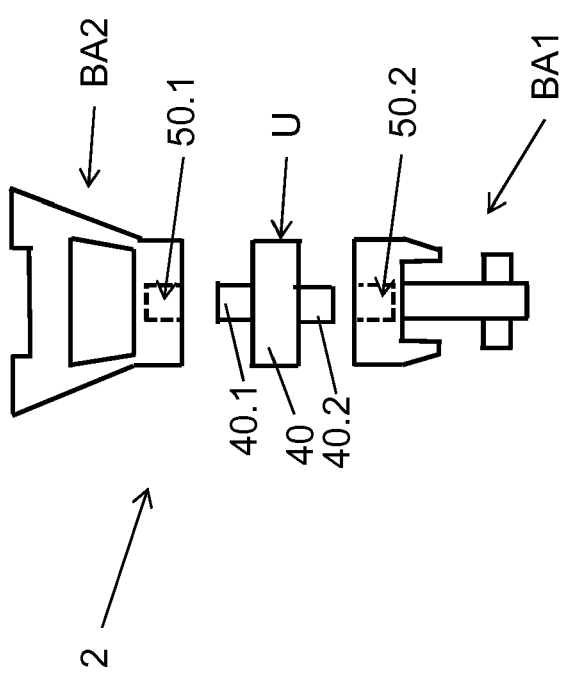

FIGS. 7a and 7b show multi-part fasteners 2 in which an intermediate part 40 connects the first and second securing sections BA1, BA2. In the illustrated embodiment, the intermediate part 40 is an interval spacing element having two connection sections 40.1, 40.2 that can take the form of a nose or a tube. These connection sections 40.1, 40.2 engage the first and second securing sections BA1, BA2. Embodiments include those in which the connection sections 40.1, 40.2 are screwed, adhesively bonded, soldered, or welded to a corresponding receiving section 50.1, 50.2 of the first and second securing sections BA1, BA2.

In the embodiment of FIGS. 7a-7b, the intermediate piece 40 has a circumferential surface U that is configured to engage a tool so that a tool can be used to rotate the fastener 2 between locking and releasing positions. A suitable tool is a fork wrench or monkey wrench. In some embodiments, the surface U has n corners, where n is a positive integer greater than two. A particularly useful embodiment is one with six corners.

FIG. 7b shows an embodiment similar to that shown in FIG. 2a but with the first and second securing section BA1, BA2 being like those shown in FIGS. 4 and 5.

In alternative embodiments, the first and second securing sections BA1, BA2 are like the second securing section BA2 from FIGS. 4 and 5. Such fasteners 2 are useful for detachably securing various components directly or indirectly at the machine frame 110 of the conveying device 100.

Figure 8:
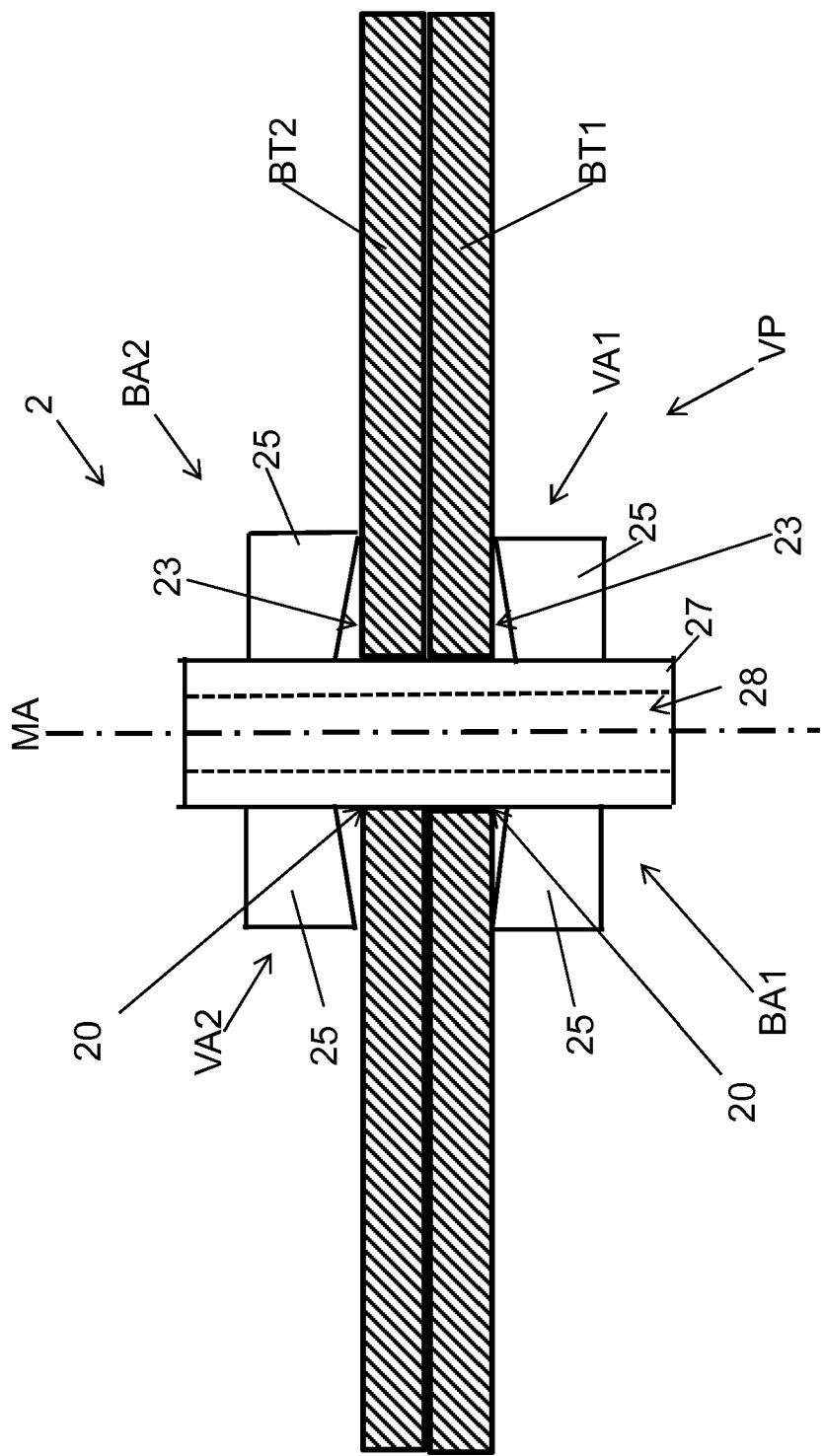
FIG. 8 is a side view of another fastener.

FIG. 8 shows a quick-fastening device 2 that omits the first and second contact sections AL1, AL2 and the receiving groove 24. In the embodiment shown in FIG. 8, the first and second component parts themselves form the contact surfaces. Each component part has a flat section 23 and a non-circular perforation 20 against which the first and second locking sections VA1, VA2, are supported on alternating sides in the locking position VP. Both the first and the second securing sections BA1, BA2 have a locking element 25 that operates in the manner discussed in connection with FIGS. 4 and 5.

Additionally, the quick-fastening device 2 shown in FIG. 8 includes an opening 28 that defines a passage that passes through the first and second securing sections BA1, BA2. The passage's interior wall defines a hexagon that accommodates a hexagonal spanner. As a result, it is possible to use a tool to carry out the transition between locking and releasing positions VP, FP.

The invention has been described heretofore on the basis of exemplary embodiments. It is understood that numerous modifications and derivations are possible without thereby departing from the inventive concept underlying the invention.

The invention claimed is:

1. An apparatus comprising a conveying device, said conveying device comprising a machine frame having a base support, a conveyor, a front deflector, a rear deflectors, a sliding strip, a profiled element, and a fastener, wherein said conveying device conveys goods along a conveyance direction, wherein said conveyor is a driven conveyor that forms a loop around said front and rear deflection devices, wherein said conveyor forms a conveying line between said front and rear deflection devices, wherein said conveyor slides along said sliding strip, wherein said sliding strip is arranged in sections along said line and disposed on said profiled element, wherein said fastener is a detachable securing device that secures said profiled element to said base support, wherein said fastener is a quick fastener, wherein said fastener is a rotary locking device that transitions between locking and releasing positions as a result of rotation thereof and wherein, when in said locking position, said rotary locking device produces at least one connection selected from the group consisting of a non-positive fit connection and a positive fit connection.

2. The apparatus of claim 1, wherein said fastener is configured to transition between a locking position and a releasing position and wherein, in said locking position, said fastener detachably secures said profiled element to said base support.

3. The apparatus of claim 1, wherein said fastener extends along an axis, wherein said fastener comprises first and second securing sections that extend along said axis, wherein said first and second securing sections are opposed to each other at opposite ends of said fastener along said axis, wherein said first securing section secures said fastener to said base support, and wherein said second securing section secures said fastener to said profiled element.

4. The apparatus of claim 1, wherein said fastener comprises securing sections that are configured form a non-positive fit connection and/or a positive fit connection when said fastener is in a locking position thereof.

5. The apparatus of claim 1, wherein, when said fastener is in said locking position, a securing position of said fastener is inserted into a cut-out opening of said profiled element and another securing position of said fastener is inserted through a perforation in said base support.

6. The apparatus of claim 1, wherein said fastener comprises a securing section that is snapped into a structure when said fastener is in said locking position and wherein said structure is selected from the group consisting of said profiled element and said base support.

7. The apparatus of claim 1, wherein said fastener comprises securing sections, wherein, when said fastener is in a locking position, one of said securing sections engages a groove in said profiled element and another of said securing sections extends through a perforation in said base support to clamp a locking element on a rear surface of said base support.

8. The apparatus of claim 1, wherein said fastener is configured to transition between a locking position and a releasing position as a result of rotation of said fastener about an axis thereof.

9. The apparatus of claim 1, wherein the fastener comprises first and second securing sections, wherein said securing sections comprise free ends that have corresponding first and second locking sections disposed thereon, wherein said base support comprises a flat section having a non-circular perforation extending therethrough, wherein said perforation has a cross section that matches that of said first locking section such that said first locking section is passable through said perforation, wherein said profiled element comprises a profiling section that forms a cut-out opening having a cross section that matches that of said second locking section such that said second locking section is receivable in said cut-out opening, and wherein rotation of said fastener causes said second locking section to clamp said second securing section to said profiled element and causes a positive fit between said second locking section and said profiled element.

10. The apparatus of claim 1, wherein said fastener comprises a first securing section that comprises a locking section at a free end thereof and wherein said locking section comprises a locking element that extends radially outward from said locking section.

11. The apparatus of claim 10, wherein said first securing section comprises a free end having a first locking section disposed thereon, wherein said first locking section comprises a contact section that defines a receiving groove, and wherein said receiving groove extends radially outward from an axis of said fastener.

12. The apparatus of claim 11, wherein said receiving groove extends along at least a portion of a circle that is concentric with said axis and wherein said contact section contacts said base support at a contact surface along said circle.

13. The apparatus of claim 1, wherein, when said fastener is in a locking position, a locking element of said fastener has been guided through a perforation in said base support and said fastener has been rotated relative to said base support such that said locking element engages an underside of said base support.

14. The apparatus of claim 13, wherein fastener comprises a first securing section that comprises a free end having a first locking section disposed thereon, wherein said first locking section comprises a contact section that defines a receiving groove, and wherein said receiving groove extends radially outward from an axis of said fastener, wherein said locking element, as a result of said fastener having been rotated, clamps to said underside, said underside being that of a flat section of said base support, wherein a securing section of said fastener is pressed against said contact section at a contact surface on a top side of said flat section of said base support such that said flat section is clamped between said contact surface and said locking element.

15. The apparatus of claim 1, wherein said fastener comprises a clamping body that has a cross-section, wherein an end section of said clamping body faces said profiled element, wherein said cross section has a length, and wherein said clamping body is tapered such that said length is greatest where said clamping body is closest to said profiled element and least where said clamping body is furthest from said profiled element.

16. The apparatus of claim 15, wherein said end section of said clamping body comprises straight contact sections on opposing sides of said clamping body.

17. The apparatus of claim 15, wherein said profiled element is C-shaped.

18. The apparatus of claim 15, wherein, when said fastener is in a locking position, said clamping body spreads corresponding inner sides of said profiled element so as to form a clamp seat in a cut-out opening formed between side limb sections of said profiled element.

19. The apparatus of claim 15, wherein said cross section has a width that is selected such that, when said fastener is in a release position, said clamping body can be guided through a cut-out opening formed by said profiled element.

20. The apparatus of claim 1, wherein said fastener is one of a plurality of identical fasteners, wherein said plurality of identical fasteners comprises a fastener that detachably secures a component to said base support, and wherein said component is selected from the group consisting of an electrical part, a switch, a sensor, a mechanical component, a mirror, a holder for a railing that guides containers, a holding plate, a holding strip, and a switch box for accommodating an electrical circuit.

\* \* \* \* \*